(12) United States Patent
Lu et al.

(10) Patent No.: US 11,425,483 B2
(45) Date of Patent: Aug. 23, 2022

(54) WIRELESS CHARGING HEADPHONE

(71) Applicant: DEXIN CORPORATION, New Taipei (TW)

(72) Inventors: Ho-Lung Lu, New Taipei (TW); Hsiu-Hsuan Lin, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 23 days.

(21) Appl. No.: 16/942,802

(22) Filed: Jul. 30, 2020

(65) Prior Publication Data

US 2021/0385566 A1 Dec. 9, 2021

(30) Foreign Application Priority Data

Jun. 4, 2020 (CN) .......................... 202010499517.5

(51) Int. Cl.
*H04R 1/10* (2006.01)
*H02J 50/12* (2016.01)
*H02J 7/02* (2016.01)

(52) U.S. Cl.
CPC .............. *H04R 1/1025* (2013.01); *H02J 7/02* (2013.01); *H02J 50/12* (2016.02); *H04R 1/1008* (2013.01); *H04R 1/1041* (2013.01); *H04R 1/1075* (2013.01); *H04R 2420/07* (2013.01)

(58) Field of Classification Search
CPC .... A63B 2024/0068; A63B 2071/0625; A63B 2071/0655; A63B 21/00189; A63B 21/0023; A63B 21/008; A63B 21/0085; A63B 21/028; A63B 2220/51; A63B 2220/56; A63B 2220/64; A63B 2220/801; A63B 2220/803; A63B 2220/833; A63B 2225/50; A63B 23/20; A63B 24/0062; A63B 71/0619; A63B 71/0622; A63B 2220/13; A63B 2024/0009; H04R 1/1025; H04R 1/10; H04R 1/1008; H04R 1/1041; H04R 1/1066; H04R 23/008; H04R 2410/00; H04R 2420/07; H04R 5/033; H04R 5/0335; H04R 5/04; H04B 10/114

USPC ......... 381/74, 370, 150, 182, 1–3, 309, 300, 381/311

See application file for complete search history.

(56) References Cited

U.S. PATENT DOCUMENTS

| | | | | |
|---|---|---|---|---|
| 7,609,026 B2 * | 10/2009 | Tsunoda | ............... | H04R 1/1025 381/370 |
| 8,582,755 B2 * | 11/2013 | Bradford | .............. | H04R 1/1058 379/430 |
| 2013/0223640 A1 * | 8/2013 | Urano | ..................... | H04R 3/00 381/74 |

* cited by examiner

*Primary Examiner* — Lun-See Lao
(74) *Attorney, Agent, or Firm* — Bacon & Thomas, PLLC (57) ABSTRACT

A wireless charging headphone (10) includes a headphone housing (1), a speaker module (2) and a ring-shaped wireless charging module (3). The headphone housing (1) includes a front housing (11) and a cavity (s), and the front housing (11) includes a plurality of acoustic holes (111). The speaker module (2) is received inside the cavity (s) and arranged corresponding to the plurality of acoustic holes (111). The ring-shaped wireless charging module (3) is received inside the cavity (s), and the ring-shaped wireless charging module (3) is arranged between the front housing (11) and the speaker module (2). Accordingly, the wireless charging headphone (10) is able to achieve the effects of excellent design, facilitated assembly and operation stability.

8 Claims, 8 Drawing Sheets

WIRELESS CHARGING HEADPHONE

BACKGROUND OF THE INVENTION

Field of the Invention

The technical field relates to a headphone, and in particular, to a wireless charging headphone.

Description of Related Art

To eliminate the movement restriction due to cables, time required to sort cables, cable damage etc. wireless headphones have gradually replaced the traditional wired headphones for listening to music, communication, watching films and playing games. Presently, the internal components of wireless headphones require an induction coil in order to allow wireless headphones to be equipped with a wireless charging function.

However, one side of the aforementioned wireless headphones includes a front housing that is placed onto the ears of a user and the other side thereof includes a rear housing exposed externally. The induction coil is usually secured at a central area in the inner side of the rear housing. To allow the induction coil to achieve electromagnetic induction stably, the electromagnetic induction requires the induction coil to be either uniformly and flatly attached onto a charging plate or have no interference from other electronic components. Consequently, the rear housing cannot adopt a curved or slanted surface design etc. or cannot have other electronic components installed (such as: indicator light, button etc.) within the rear housing.

In view of above, the inventor seeks to improve and overcome the aforementioned drawback associated with currently existing technology after years of research and development along with the utilization of academic theories, in order to achieve a reasonable design of the present invention capable of effectively overcoming the aforementioned drawbacks.

SUMMARY OF THE INVENTION

The present invention provides a wireless charging headphone, utilizing a ring-shaped wireless charging module arranged between the front housing and the speaker module in order to allow the wireless charging headphone to achieve better design, facilitated assembly and operation stability.

In an exemplary embodiment of the present invention, the present invention provides a wireless charging headphone, comprising: a headphone housing having a front housing and a cavity; the front housing having a plurality of acoustic holes; a speaker module received inside the cavity and arranged corresponding to the plurality of acoustic holes; and a ring-shaped wireless charging module received inside the cavity; the ring-shaped wireless charging module arranged between the front housing and the speaker module.

In view of the above, since the ring-shaped wireless charging module is arranged between the front housing and the speaker module, there are no other electronic components installed at areas adjacent to the front housing so that the operation of the ring-shaped wireless charging module is not affected by the speaker or other electronic components. In addition, the design appearance and electronic components (such as: indicator light, button etc.) are not required to be changed due to the installation of the ring-shaped wireless charging module; consequently, the design, facilitated assembly and operation stability of the wireless charging headphone can be enhanced.

DETAILED DESCRIPTION OF THE INVENTION

The following provides detailed technical content of the present invention along with the accompanied drawings. However, it shall be understood that the accompanied drawings are provided for reference and illustration purposes only, such that they shall not be used to limit the scope of the present invention.

As shown in FIG. 1 to FIG. 5, the present invention provides a wireless charging headphone. The wireless charging headphone 10 mainly comprises one or a plurality of headphone housings 1, one or a plurality of speaker modules 2 and one or a plurality of ring-shaped wireless charging modules 3.

As shown in FIG. 1 to FIG. 5, the headphone housing 1 includes a front housing 11 and a rear housing 12 arranged opposite from each other. The front housing 11 includes a plurality of acoustic holes 111, and the internal of the headphone housing 1 includes a cavity s; wherein the front housing 11 is provided for placement onto an ear of a user.

Figure 3:
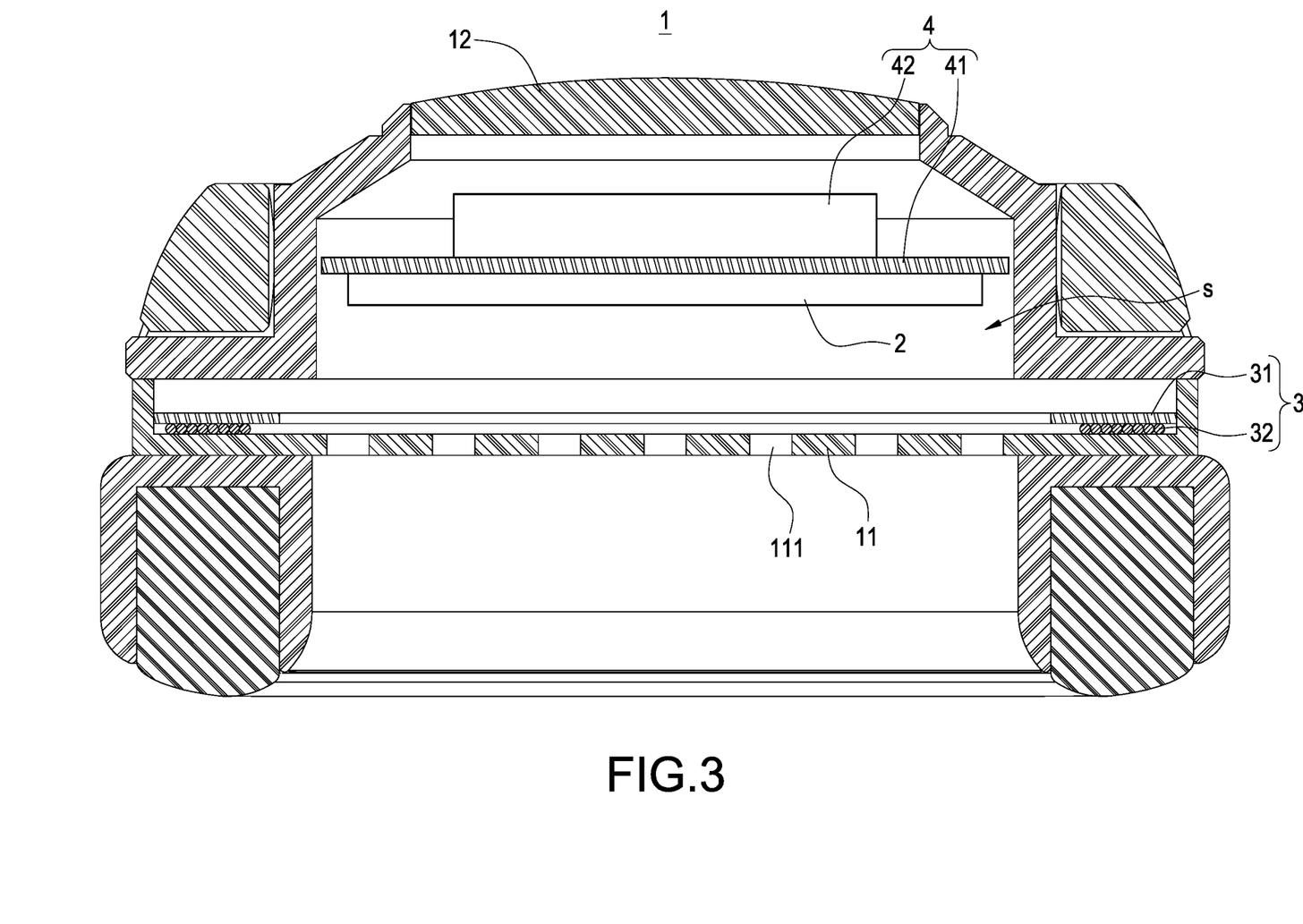
FIG. 3 is a cross sectional view of the wireless charging headphone of the present invention.

As shown in FIG. 3, the speaker module 2 is received inside the cavity s and arranged corresponding to the plurality of acoustic holes 111 in order to allow sound generated by the speaker module 2 to be transmitted to the external of the front housing 11 via the acoustic holes 111.

As shown in FIG. 1 to FIG. 5, the ring-shaped wireless charging module 3 is received inside the cavity s, and the ring-shaped wireless charging module 3 is arranged between the front housing 11 and the speaker module 2 and is also arranged to surround an outer periphery of the speaker module 2 in order to prevent any hinderance to the sound generated by the speaker module 2.

The following provides a further detailed description. The ring-shaped wireless charging module 3 is secured on the front housing 11 and is arranged to surround an outer periphery of the plurality of acoustic holes 111 such that the ring-shaped wireless charging module 3 does not block the plurality of acoustic holes 111, allowing the sound generated by the speaker module 2 to be successfully transmitted to the plurality of acoustic holes 111.

In addition, according to an exemplary embodiment of the present invention, the ring-shaped wireless charging module 3 comprises a ring-shaped circuit board 31 and a ring-shaped magnetic resonance coil 32 installed on the ring-shaped circuit board 31. The ring-shaped magnetic resonance coil 32 is attached onto a surface of the ring-shaped circuit board 31 adjacent to the front housing 11.

Furthermore, the ring-shaped magnetic resonance coil 32 is a magnetic resonance coil of a ring shape. The magnetic resonance coil uses the "magnetic resonance" to perform wireless charging. In comparison to the "electromagnetic induction", the "magnetic resonance" method is able to achieve a charging distance of several meters, and the charging efficiency is also increased.

Figure 1:
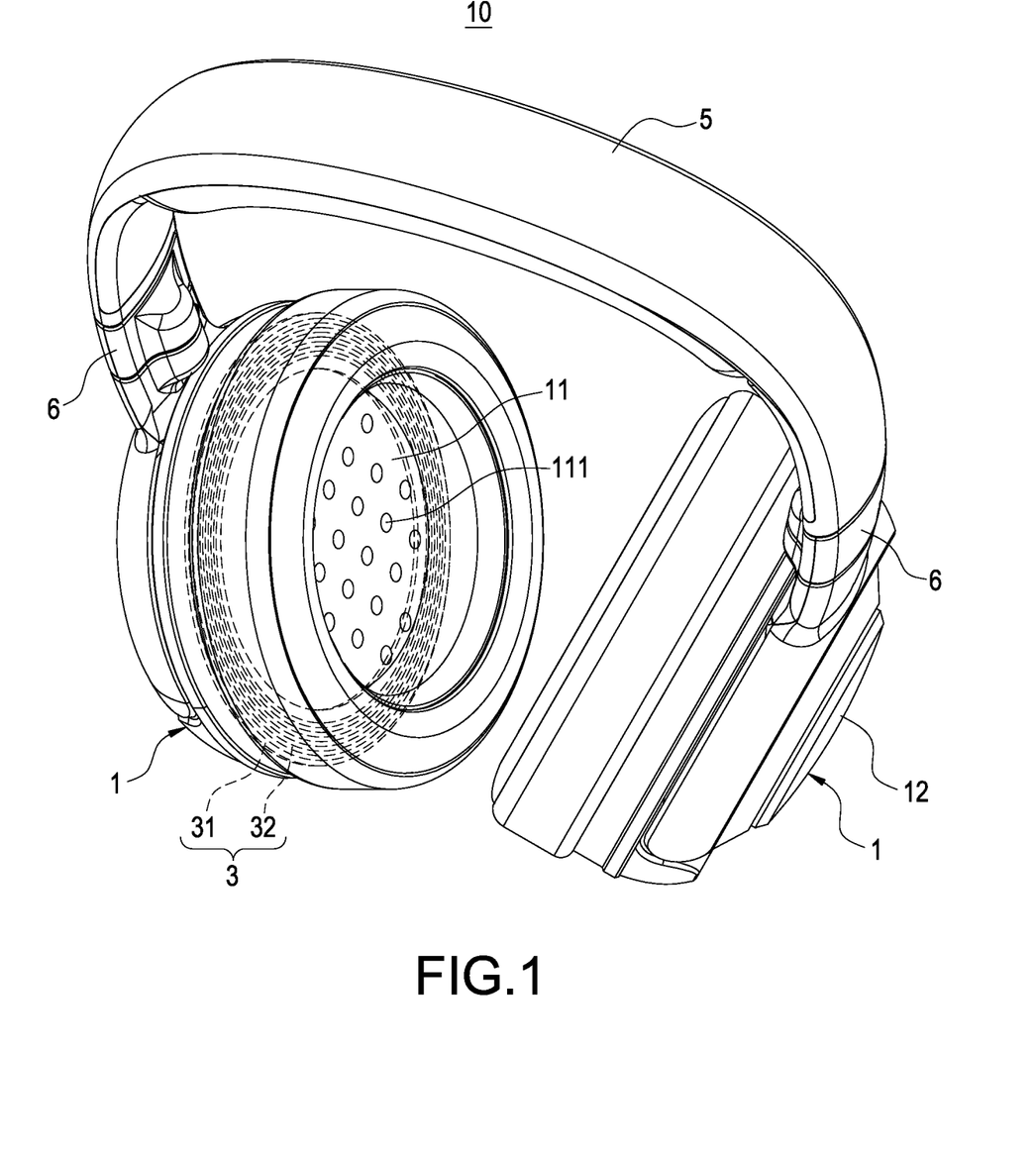
FIG. 1 is a perspective assembly view of the wireless charging headphone of the present invention.
Figure 2:
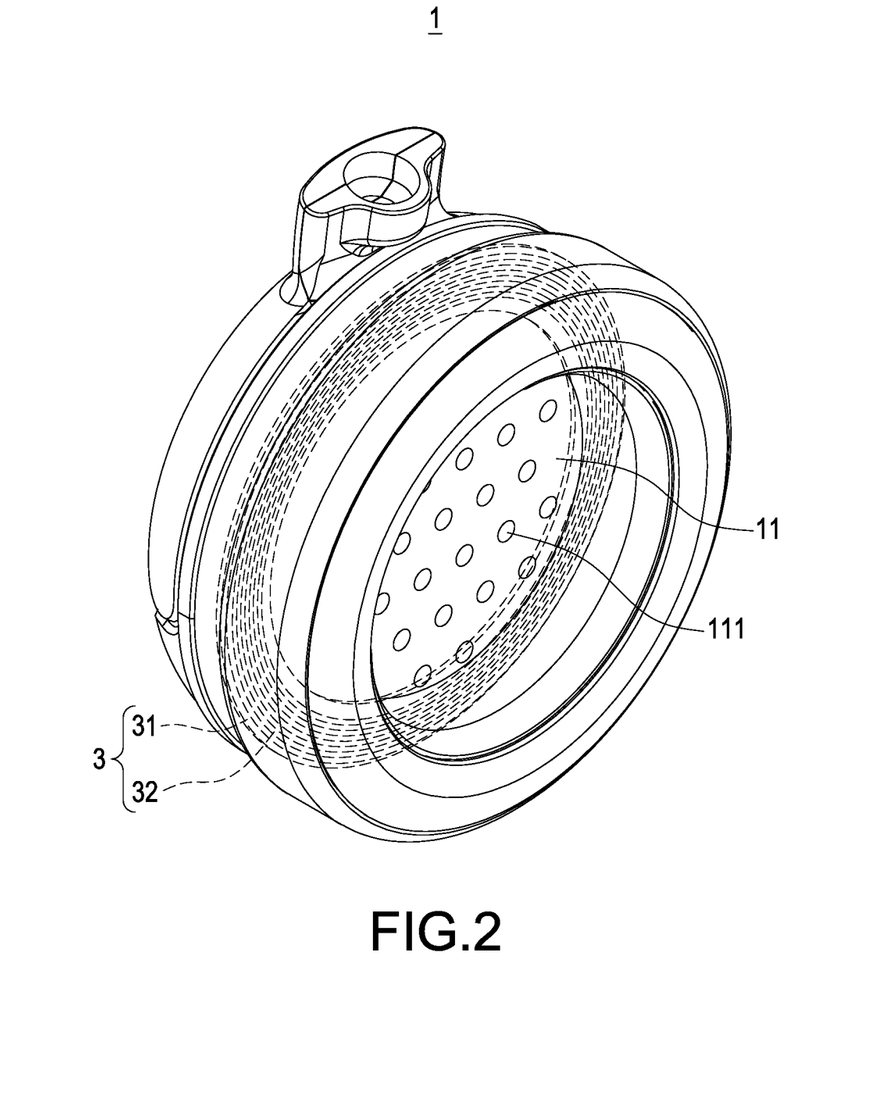
FIG. 2 is a partial assembly view of the wireless charging headphone of the present invention.
Figure 4:
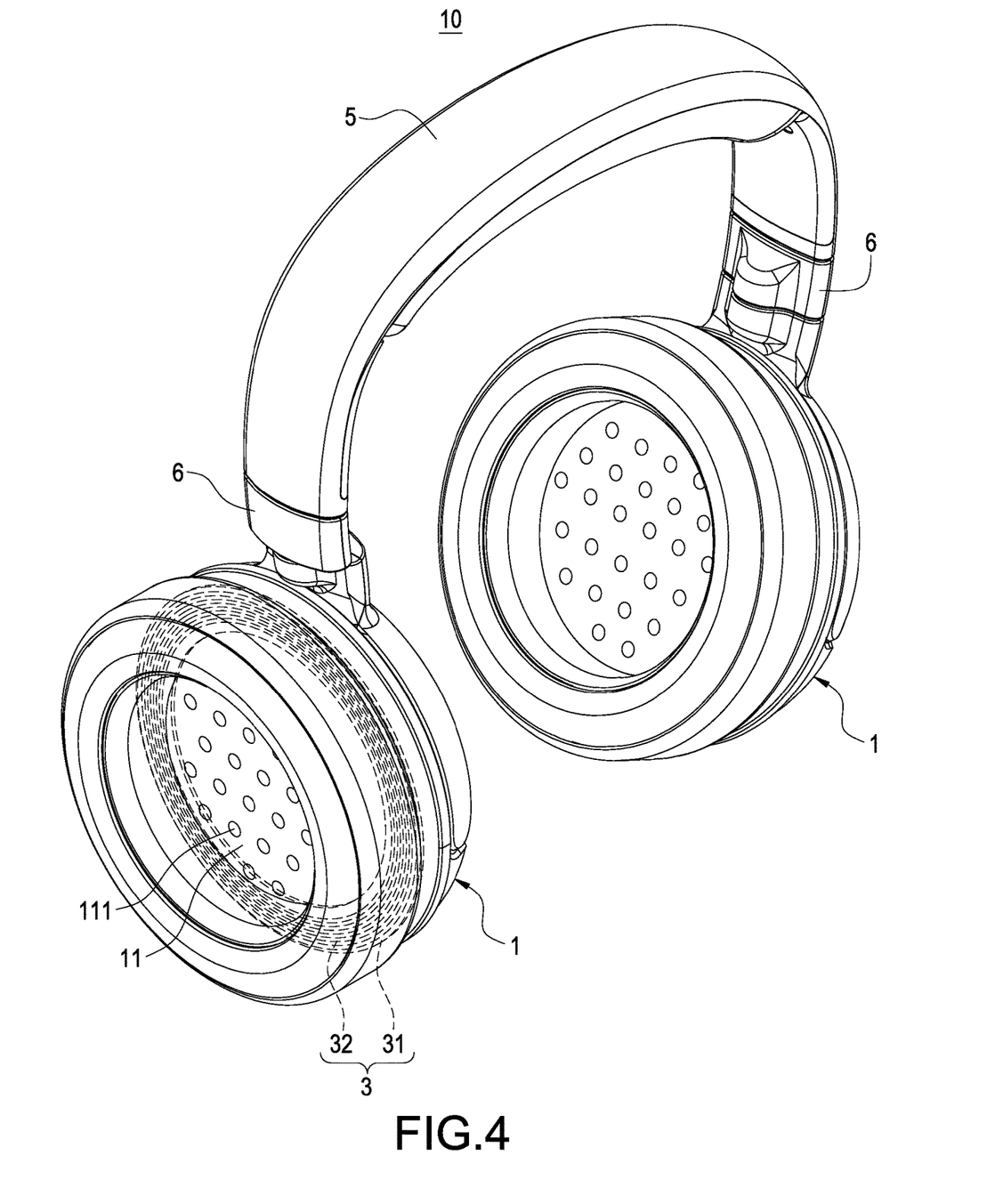
FIG. 4 is a state of use view of the wireless charging headphone of the present invention.
Figure 5:
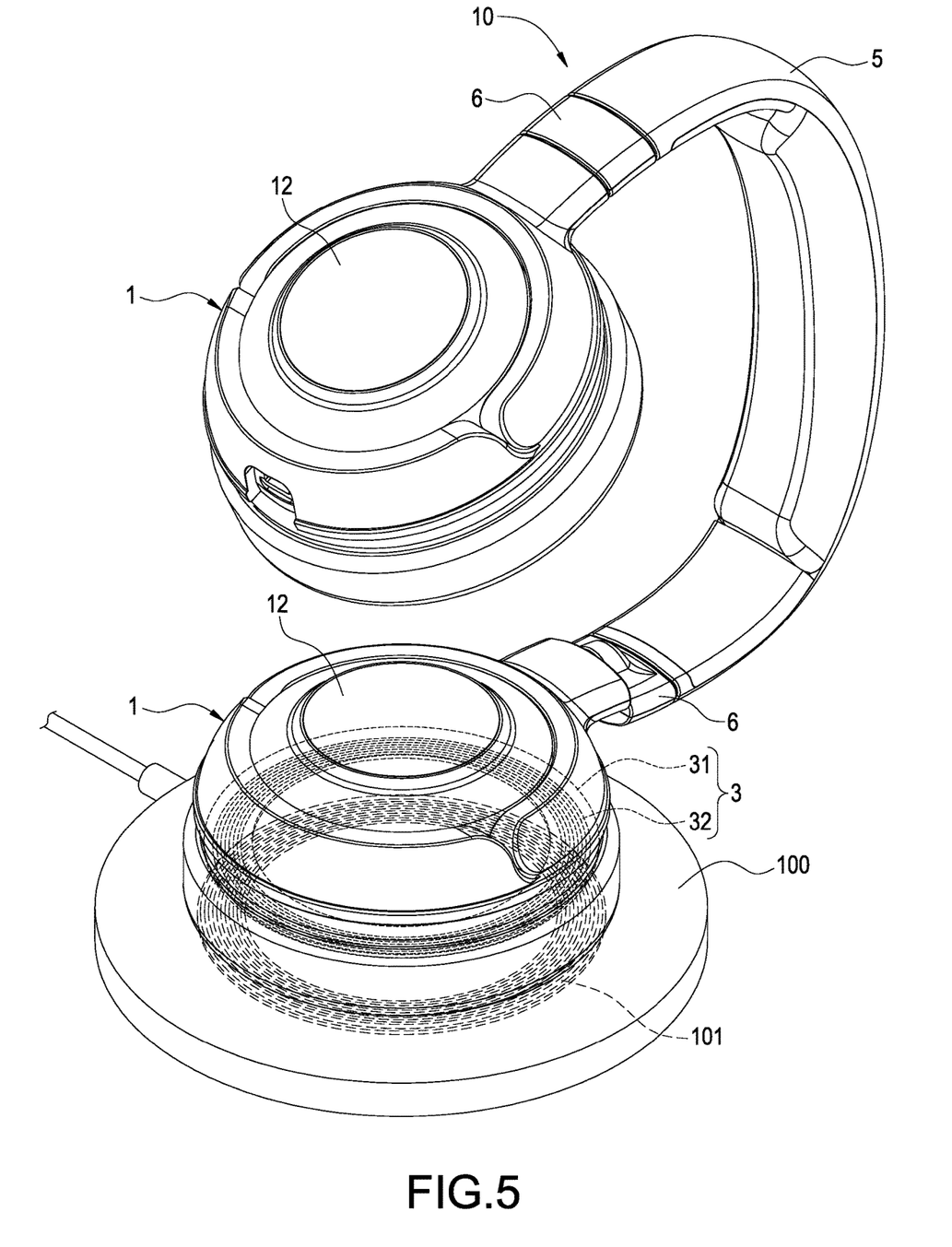
FIG. 5 is another state of use view of the wireless charging headphone of the present invention.

As shown in FIG. 3, the wireless charging headphone of the present invention further comprises one or a plurality of control modules 4. The control module 4 is received inside the cavity s, and the control module 4 comprises a control circuit board 41 and a battery 42. The control circuit board 41 is electrically connected to the speaker module 2, the ring-shaped circuit board 31 and the battery 42 respectively. A shown in FIG. 1, FIG. 4, and FIG. 5, the wireless charging headphone 10 of the present invention further comprises a supporting rack 5. In an exemplary embodiment of the present invention, the quantity of the headphone housing 1, the speaker module 2, the ring-shaped wireless charging module 3 and the control module 4 is two for each of these components respectively. In each one of the speaker modules 2, the ring-shaped wireless charging modules 3 and the control modules 4 is received inside the cavity s of each one of the headphone housings 1. In addition, the two headphone housings 1 are installed at two ends of the supporting rack 5 respectively. The supporting rack 5 has a U shape in order to allow the supporting rack 5 to be worn on the head portion, the back of head or neck of a user; however, the present invention is not limited to such a configuration only. As shown in FIG. 1, FIG. 4, and FIG. 5, the wireless charging headphone 10 further comprises two rotating hinges 6. The two rotating hinges 6 are installed between the two ends of the supporting rack 5 and the two headphones 1. Each one of the headphone housings 1 is able to rotate relative to the supporting rack 5 via each one of the rotating hinges 6.

As shown in FIG. 4 to FIG. 5, according to the state of use of the wireless charging headphone 10 of the present invention, the headphone housing 1 utilizes the rotating hinge 6 to rotate the front housing 11 to face outward, following which the front housing 11 is placed onto the charging board 100. The transmission end induction coil 101 inside the charging board 100 adopts the principle of "magnetic resonance" to transmit wireless power. The transmission end induction coil 101 uses resonance frequency vibration to transmit an alternating magnetic field to its surroundings. The ring-shaped magnetic resonance coil 32 of the ring-shaped wireless charging module 3 is able to detect the alternating magnetic field in order to convert it into an AC current. Finally, the AC current is stored in the battery 42 via the ring-shaped circuit board 31 and the control circuit board 41. The control circuit board 41 then utilizes the battery 42 to supply power to the speaker module 2 and other electronic components.

In addition, an induction coil for wireless charging is usually secured at the central area of the inner side of the rear housing such that the rear housing cannot have a curved or slanted surface design or cannot allow the installation of other electronic components (such as: indicator light, button etc.). In comparison to the prior art, the ring-shaped wireless charging module 3 of the wireless charging headphone 10 of the present invention is arranged between the front housing 11 and the speaker module 2 and is also arranged to surround an outer periphery of the speaker module 2. Consequently, since the area adjacent to the front housing 11 does not have any other electronic components installed, the operation of the ring-shaped wireless charging module 3 is not affected by the speaker module 2 or other electronic components. In addition, the design appearance and the electronic components (such as: indicator light, button etc.) configuration of the rear housing 12 are not required to be changed due to the limitations of the wireless charging module 3. As a result, the design, facilitated assembly and operation stability of the wireless charging headphone 10 are enhanced.

Figure 6:
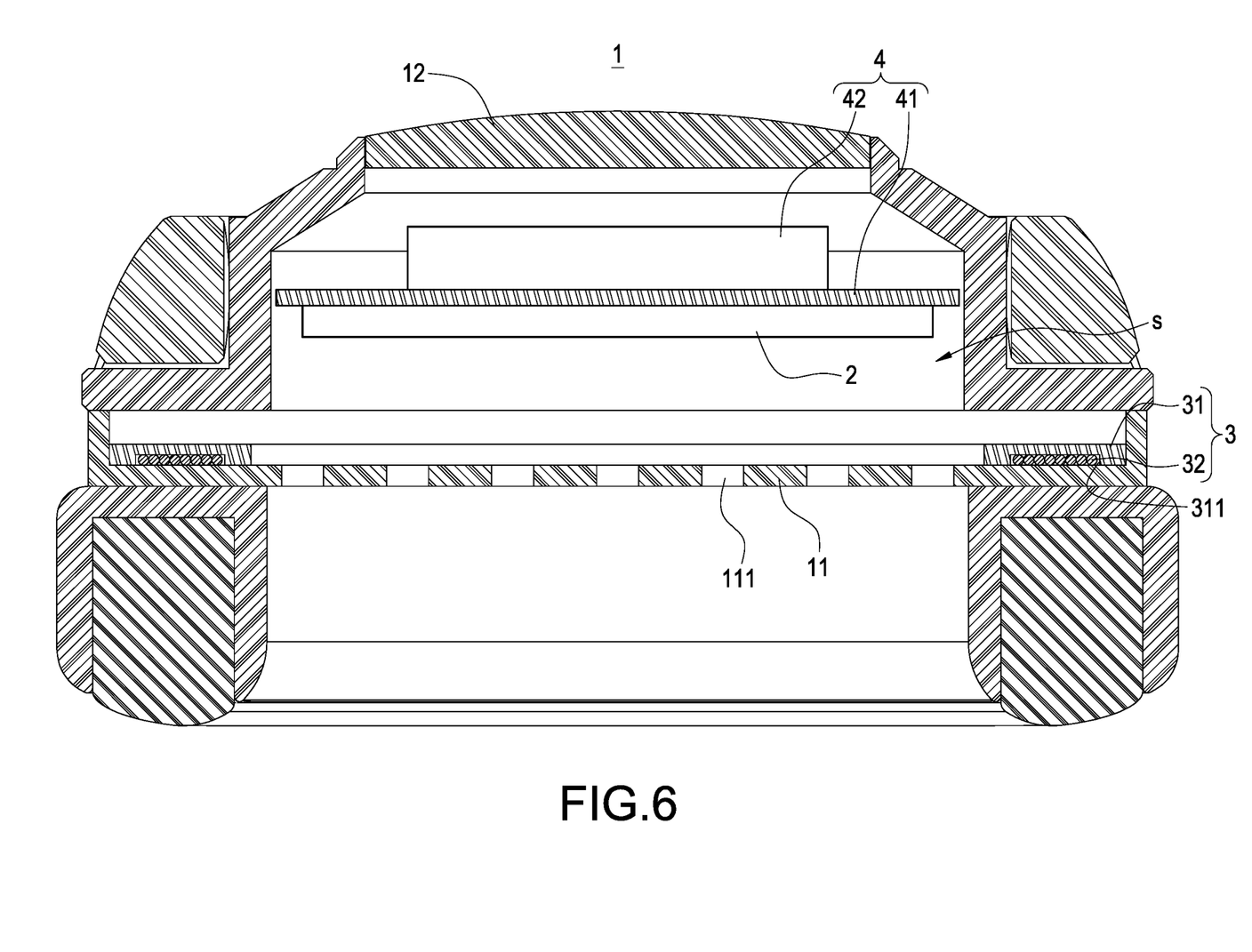
FIG. 6 is a cross sectional view of the wireless charging headphone according to another exemplary embodiment of the present invention.

Please refer to FIG. 6, which shows another exemplary embodiment of the wireless charging headphone 10 of the present invention. The exemplary embodiment shown in FIG. 6 is generally identical to the exemplary embodiment shown in FIG. 1 to FIG. 5. The difference between the exemplary embodiment shown in FIG. 6 and the exemplary embodiment shown in FIG. 1 to FIG. 5 mainly lies in the different structure of the ring-shaped wireless charging module 3.

The following provides a further detailed description. In this exemplary embodiment, the ring-shaped circuit board 31 is secured at the front housing 11, and the ring-shaped circuit board 31 includes a slot 311 formed on a surface adjacent to the front housing 11. The ring-shaped magnetic resonance coil 32 is inserted into the slot 311 in order to allow the ring-shaped resonance coil 32 to be more stably secured on the ring-shaped circuit board 31.

Figure 7:
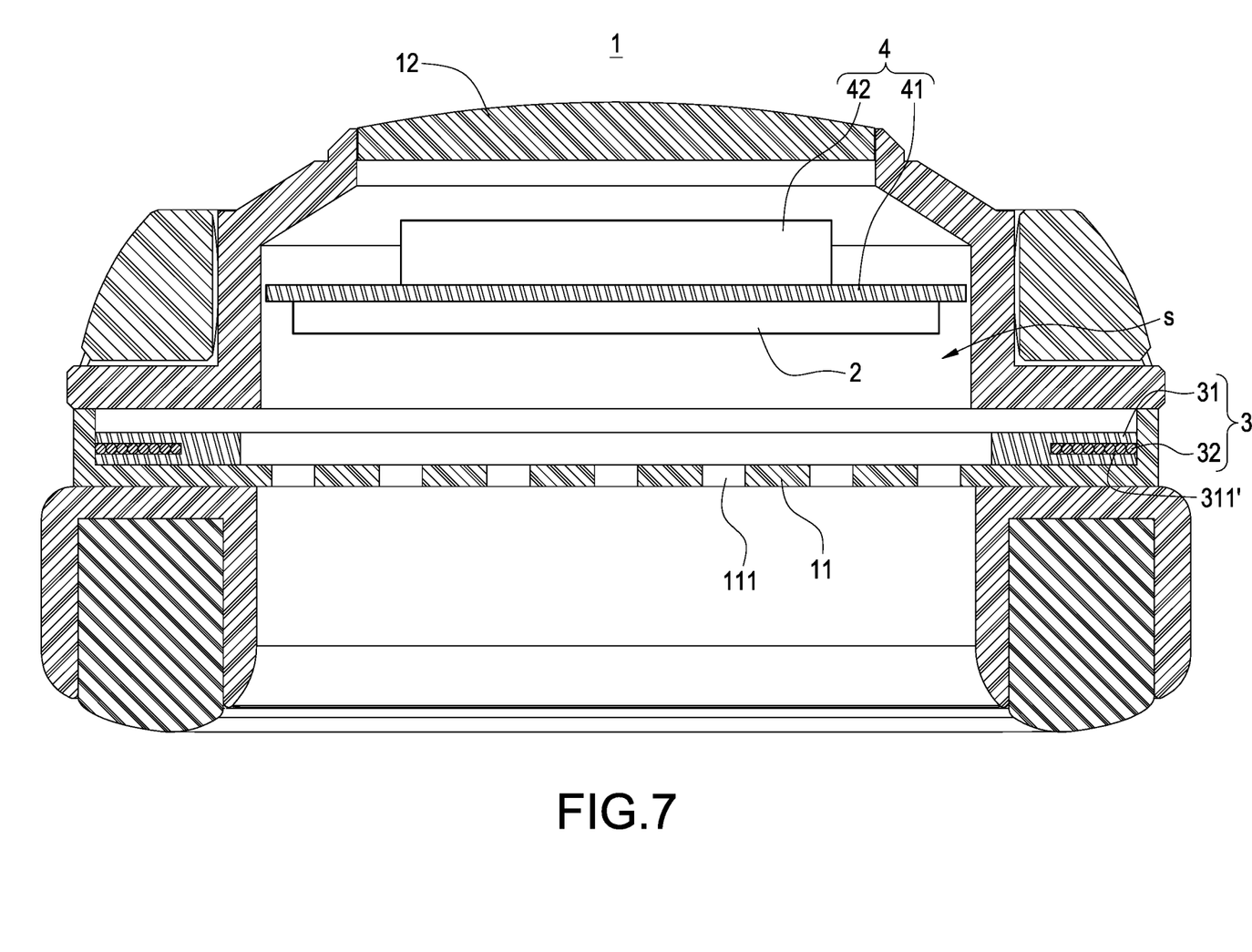
FIG. 7 is a cross sectional view of the wireless charging headphone according to still another exemplary embodiment of the present invention.

Please refer to FIG. 7, showing still another exemplary embodiment of the wireless charging headphone 10 of the present invention. The exemplary embodiment shown in FIG. 7 is generally identical to the exemplary embodiment shown in FIG. 1 to FIG. 5. The difference between the exemplary embodiment shown in FIG. 7 and the exemplary embodiment shown in FIG. 1 to FIG. 5 mainly lies in the different structure of the ring-shaped wireless charging module 3.

The following provides a further detailed description. In this exemplary embodiment, the ring-shaped circuit board 31 is secured at the front housing 11, and an outer circumference of the ring-shaped circuit board 31 includes a slot 311' recessed inward thereon. The ring-shaped magnetic resonance coil 32 is inserted into the slot 311' in order to allow the ring-shaped resonance coil 32 to be more stably secured on the ring-shaped circuit board 31.

Figure 8:
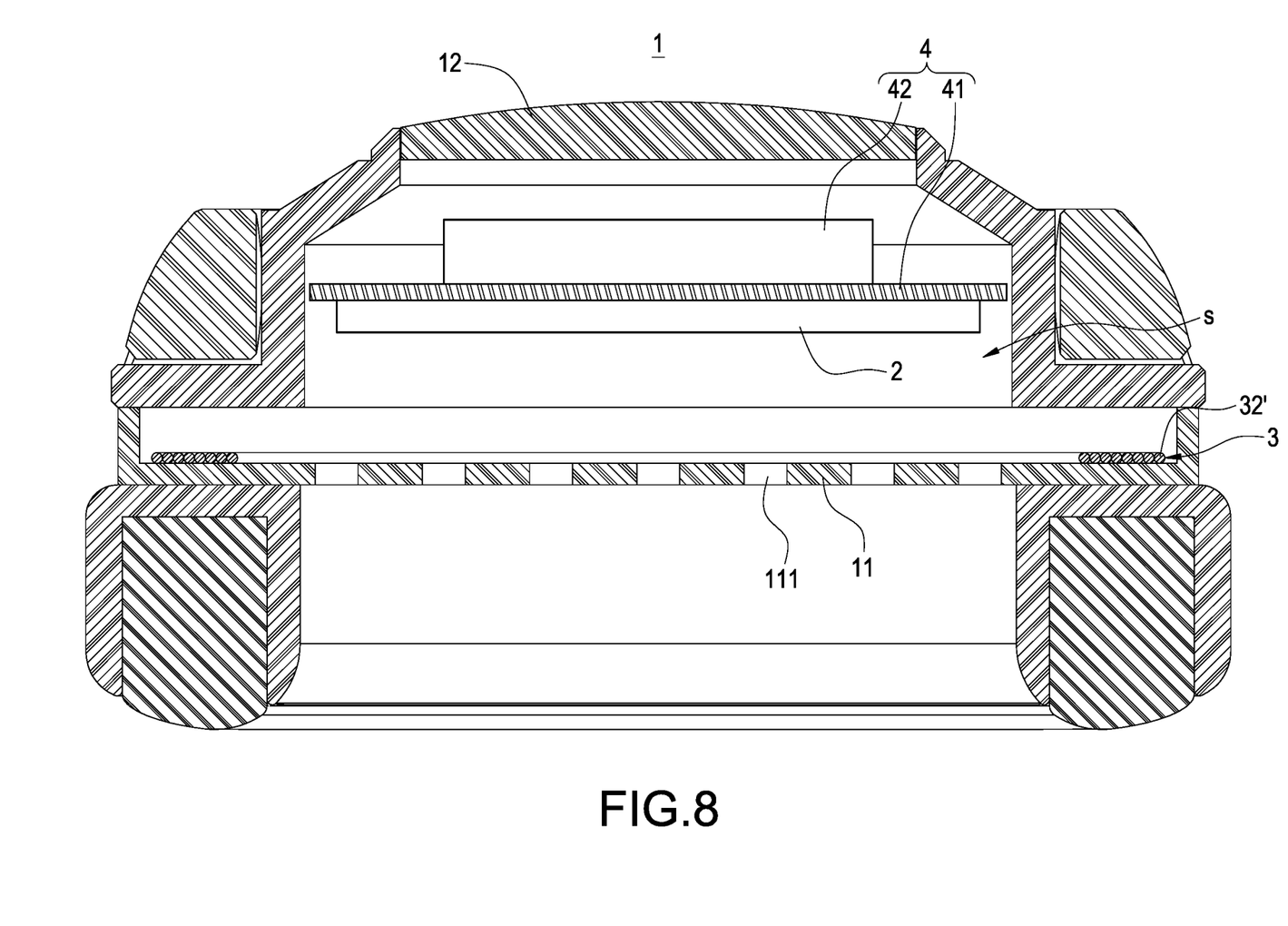
FIG. 8 is a cross sectional view of the wireless charging headphone according to yet another exemplary embodiment of the present invention.

Please refer to FIG. 8, showing yet another exemplary embodiment of the wireless charging headphone 10 of the present invention. The exemplary embodiment shown in FIG. 8 is generally identical to the exemplary embodiment shown in FIG. 1 to FIG. 5. The difference between the exemplary embodiment shown in FIG. 8 and the exemplary embodiment shown in FIG. 1 to FIG. 5 mainly lies in the different structure of the ring-shaped wireless charging module 3.

The following provides a further detailed description. In this exemplary embodiment, the ring-shaped wireless charging module 3 does not include the element of circuit board 31 (as shown in FIG. 1 to FIG. 5), and the ring-shaped charging module 3 comprises only a ring-shaped magnetic resonance coil 32' secured at the front housing 11. The ring-shaped magnetic resonance coil 32' is electrically connected to the circuit board 41 such that the ring-shaped wireless charging module 3 is able to achieve the merits of a reduced number of components and saving costs. In view of the above, the present invention of the wireless charging headphone has not been disclosed in any products of similar categories and has not been used publicly. In addition, the present invention is of novelty and an inventive step, complying with the patentability for an invention patent. Accordingly, this patent application is hereby filed according to the law in light of the grant of the patent right for the protection of the rights of the inventor.

What is claimed is:

1. A wireless charging headphone, comprising:
   a headphone housing (1) having a front housing (11) and a cavity (s); the front housing (11) having a plurality of acoustic holes (111);
   a speaker module (2) received inside the cavity (s) and arranged corresponding to the plurality of acoustic holes (111); and
   a ring-shaped wireless charging module (3) received inside the cavity (s); the ring-shaped wireless charging module (3) arranged between the front housing (11) and the speaker module (2);
   wherein the ring-shaped wireless charging module (3) comprises a ring-shaped circuit board (31) and a ring-shaped magnetic resonance coil (32) installed on the ring-shaped circuit board (31);
   wherein the ring-shaped circuit board (31) includes a slot (311) formed on a surface adjacent to the front housing (11), and the ring-shaped magnetic resonance coil (32) is inserted into the slot (311), an opening is defined by an inner edge of the ring-shaped circuit board (31), and the plurality of acoustic holes (111) are disposed opposite to the opening.

2. The wireless charging headphone according to claim 1, wherein the ring-shaped wireless charging module (3) is arranged to surround an outer periphery of the speaker module (2).

3. The wireless charging headphone according to claim 2, wherein the ring-shaped wireless charging module (3) is secured on the front housing (11) and is arranged to surround an outer periphery of the plurality of acoustic holes (111).

4. The wireless charging headphone according to claim 1, further comprising a control module (4); the control module (4) is received inside the cavity (s); the control module (4) comprises a control circuit board (41) and a battery (42); the control circuit board (41) is electrically connected to the speaker module (2), the ring-shaped circuit board (31) and the battery (42) respectively.

5. A wireless charging headphone, comprising:
   a headphone housing (1) having a front housing (11) and a cavity (s); the front housing (11) having a plurality of acoustic holes (111);
   a speaker module (2) received inside the cavity (s) and arranged corresponding to the plurality of acoustic holes (111); and
   a ring-shaped wireless charging module (3) received inside the cavity (s); the ring-shaped wireless charging module (3) arranged between the front housing (11) and the speaker module (2);
   wherein the ring-shaped wireless charging module (3) comprises a ring-shaped circuit board (31) and a ring-shaped magnetic resonance coil (32) installed on the ring-shaped circuit board (31);
   wherein an outer circumference of the ring-shaped circuit board (31) includes a slot (311') recessed inward thereon, and the ring-shaped magnetic resonance coil (32) is inserted into the slot (311'), an opening is defined by an inner edge of the ring-shaped circuit board (31), and the plurality of acoustic holes (111) are disposed opposite to the opening.

6. The wireless charging headphone according to claim 5, wherein the ring-shaped wireless charging module (3) is arranged to surround an outer periphery of the speaker module (2).

7. The wireless charging headphone according to claim 6, wherein the ring-shaped wireless charging module (3) is secured on the front housing (11) and is arranged to surround an outer periphery of the plurality of acoustic holes (111).

8. The wireless charging headphone according to claim 5, further comprising a control module (4); the control module (4) is received inside the cavity (s); the control module (4) comprises a control circuit board (41) and a battery (42); the control circuit board (41) is electrically connected to the speaker module (2), the ring-shaped circuit board (31) and the battery (42) respectively.

* * * * *